United States Patent [19]

Despault et al.

[11] 4,406,806
[45] Sep. 27, 1983

[54] THERMAL ENERGY STORAGE

[75] Inventors: Gaston J. Despault; Aly E. Fouda; J. Bryan Taylor; C. Edward Capes, all of Ottawa, Canada

[73] Assignee: Canadian Patents & Development Limited, Ottawa, Canada

[21] Appl. No.: 351,852

[22] Filed: Feb. 24, 1982

[30] Foreign Application Priority Data

Mar. 19, 1981 [CA] Canada .................................. 373435

[51] Int. Cl.$^3$ ........................... C09K 5/06; F24H 7/00
[52] U.S. Cl. ...................................... 252/70; 126/400; 165/104.13; 165/104.17; 165/DIG. 4
[58] Field of Search ......................... 252/70; 126/400; 165/10, 104.13, 104.17, DIG. 4

[56] References Cited

U.S. PATENT DOCUMENTS 4,086,958  5/1978  Lindner et al. ................. 126/400 X
4,099,557  7/1978  Bricard et al. ................. 165/104.17

Primary Examiner—John E. Kittle
Assistant Examiner—Robert A. Wax
Attorney, Agent, or Firm—Ronald G. Bitner

[57] ABSTRACT

A thermal energy storage medium comprising $Na_2SO_4.10H_2O$ and $Na_2HPO_4.12H_2O$. This material provides advantages over $Na_2SO_4.10H_2O$ alone such as constancy of heat delivery temperature and energy output, improved reversibility, and greater usable volumetric storage capacity after repeated cycling.

4 Claims, 3 Drawing Figures

THERMAL ENERGY STORAGE

BACKGROUND OF THE INVENTION

This invention relates to the storage of thermal energy, and particularly to a thermal energy storage material, a method of preparing this material, and a system incorporating the material.

Salt hydrates are known for their ability to store thermal energy. These salt hydrates absorb thermal energy as they melt or decompose and release heat as they revert to the solid hydrated crystalline form. $Na_2SO_4.10H_2O$ is the most commonly reported hydrate since it is relatively inexpensive and has high heat storage capacity. However, $Na_2SO_4.10H_2O$ has a number of undesirable characteristics that present difficulties when used in thermal energy storage systems. Although, ideally, the decomposition of $Na_2SO_4.10H_2O$ can be reversed on cooling, complete reversibility is difficult to achieve because rapid sedimentation of the decomposition product (anhydrous $Na_2SO_4$) occurs. U.S. Pat. No. 3,986,969 to M. Telkes disclosed the use of thickening agents to reduce this sedimentation and improve reversibility. D. R. Biswas, "Thermal Energy Storage Using Sodium Sulfate Decahydrate and Water," Solar Energy 19, 99 (1977), discloses the use of excess water. Excess water ensures complete reversibility but the energy capacity of the system is reduced and the heat delivery occurs at a steadily declining temperature. In static systems, supercooling is reported and heat acceptance and delivery rates vary with the state of charge.

SUMMARY OF THE INVENTION

An object of the present invention is to provide a thermal storage composition which delivers thermal energy at a substantially constant temperature as it crystallizes.

Another object is to provide a thermal storage composition for which there is no significant deterioration with repeated cycling.

Another object is to provide a thermal energy storage system that allows recovery of heat at a substantially constant temperature and substantially constant delivery rate and maximizes the heat recoverable from a given volume of storage material.

It has been found that these objects can be met by a material comprising $Na_2SO_4$, $Na_2HPO_4$ and water, preferably with $Na_2SO_4$ and $Na_2HPO_4$ in approximately equal molar proportions, and sufficient water to form the hydrates $Na_2SO_4.10H_2O$ and $Na_2HPO_4.12H_2O$, respectively.

Although it is not understood with certainty why the present mixture of the hydrates of $Na_2SO_4$ and $Na_2HPO_4$ should perform differently from the salts individually, it is believed that the unique properties are due to the fact that no mixed crystals or eutectics are formed. It appears that the proximity of crystallization temperatures of these two hydrates is a factor. Analytical results are consistent with the simultaneous but independent growth of $Na_2SO_4.10H_2O$ and $Na_2HPO_4.12H_2O$ crystals. At complete solidification, the total of water used equals the sum of the stoichiometric requirements of the two hydrates. However, up to this point, the individual crystallizing salt hydrates contact a liquid phase that, in effect, is rich in water. This reduces the possibility of anhydrous salt formation, making the system fully reversible.

According to one aspect of the present invention, there is provided a thermal energy storage material comprising a mixture of $Na_2SO_4$, $Na_2HPO_4$ and water, with a $Na_2SO_4:Na_2HPO_4$ mole ratio of from 1.1:0.9 to 1:2, and sufficient water to convert all the $Na_2SO_4$ and $Na_2HPO_4$ to $Na_2SO_4.10H_2O$ and $Na_2HPO_4.12H_2O$, respectively.

The above storage material can best be produced by first dissolving all the selected quantity of $Na_2SO_4$ in water and then adding and dissolving the selected quantity of $Na_2HPO_4$. The balance of the water, if any, needed to form the hydrates of the salts, as described above, can then be added. Note that any water contained in the original salts used in the mixture preparation should be included in the calculation of the total water needed in the system to form the hydrates $Na_2SO_4.10H_2O$ and $Na_2HPO_4.12H_2O$, respectively.

According to another aspect of the present invention, there is provided a thermal energy storage system comprising the above thermal energy storage material, an energy transfer fluid immiscible with the storage material, and means for passing said fluid through the energy storage material for exchange of thermal energy.

DESCRIPTION OF THE PREFERRED EMBODIMENTS

The thermal energy storage material of the present invention comprises a mixture of $Na_2SO_4$, $Na_2HPO_4$ and water. The best performance in terms of constancy of energy delivery temperature and rate, and reversibility, was found to be obtainable with equal molar quantities of $Na_2SO_4$ and $Na_2HPO_4$ and sufficient water to convert all the salt to the hydrate form $Na_2SO_4.10H_2O$ and $Na_2HPO_4.12H_2O$. It was found that such a mixture crystallizes at about 28° C.

It appears that a useful thermal energy storage material is obtainable with a $Na_2SO_4:Na_2HPO_4$ mole ratio range of from 1.1:0.9 to 1:2. As the $Na_2SO_4:Na_2HPO_4$ mole ratio is increased beyond 1.1:0.9, there is an increasing tendency for anhydrous salt formation and irreversibility. With the $Na_2SO_4:Na_2HPO_4$ mole ratio reduced below 1:2, there is an increasing tendency for formation of the hydrate $Na_2HPO_4.7H_2O$ instead of the desired $Na_2HPO_4.12H_2O$.

After the $Na_2SO_4:Na_2HPO_4$ ratio has been selected, the proportion of water required to convert all salt to the hydrate form can be calculated. When the quantities of all the constituents have been determined, the mixture can be prepared. It was found that the desired material could be obtained if all the selected $Na_2SO_4$ is first mixed with sufficient water to dissolve it readily, following which the selected quantity of $Na_2HPO_4$ is added, followed by the balance of the water, if any. If however, the anhydrous salts are mixed together first and then mixed with water, incomplete dissolution of $Na_2SO_4$ results.

Figure 1:
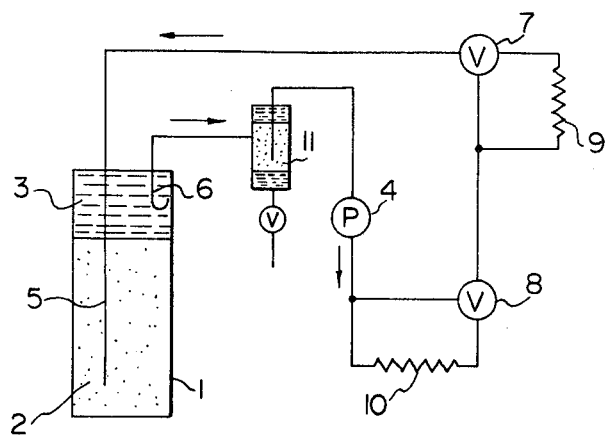
FIG. 1 illustrates one embodiment of a system in accordance with the present invention.

FIG. 1 illustrates a system utilizing the present thermal energy storage material. A vessel 1 contains the thermal energy storage medium 2 and an immiscible thermal energy transfer fluid 3. A pump 4 circulates the energy transfer fluid for contact with the energy storage material 2 in the container 1 by means of the inlet pipe 5 and outlet pipe 6. Three-way valves 7 and 8 control the flow of fluid to the heat exchangers 9 and 10, respectively. In a solar heating system, for example, the heat exchanger 9 may form part of a solar collector while 10 provides heat for a building. A salt trap 11 containing water through which the energy transfer fluid bubbles collects any salt carried over from outlet 6 and so protects downstream parts of the system from salt deposition.

In operation, the energy storage material crystallizes to the hydrate form as heat is removed from the fluid at the heat exchanger 10, and decomposes as heat is supplied at 9.

It will be understood that the system can be arranged in various ways, or used in various applications benefiting from thermal energy storage.

EXAMPLE

Two thermal energy storage systems were compared, one using aqueous $Na_2SO_4$, and the other using $Na_2SO_4$ and $Na_2HPO_4$ in accordance with the present invention. Both compositions were tested with the same apparatus using aliphatic hydrocarbon solvent, specifically Varsol $^R$ as the heat transfer fluid (HTF). The apparatus similar to that illustrated in FIG. 1. The storage container volume was 4 cu.ft. containing 250 lbs. of the energy storage material and the balance heat transfer fluid. For the $Na_2SO_4$, in order to provide full reversibility, additional water in excess of the stoichiometric requirement for the hydrate was used. The amount of excess water approximated the amount recommended by D. R. Biswas, referred to heretofore, namely, 31.8% water by weight. Without such excess of water, anhydrous $Na_2SO_4$ forms and reversibility is lost after a few cycles. The actual values of excess water are given in Table 1.

Tables 1 and 2 show samples of data obtained from numerous runs for the $Na_2SO_4$ and $Na_2SO_4$—$Na_2HPO_4$ systems, respectively. To provide a consistent basis of comparison, the storage capacity is listed in terms of latent heat obtained by subtracting the specific, or sensible, heat resulting from the temperature drop of the run. The data indicates that the $Na_2SO_4$—$Na_2HPO_4$ mixture provided a significantly higher latent heat output per unit volume, indicating a greater storage capacity and consequently, allowing the use of a smaller storage container for a given energy storage capacity. Also, the lower "% standard deviation" indicates a more constant power output from the present material.

Figure 2:
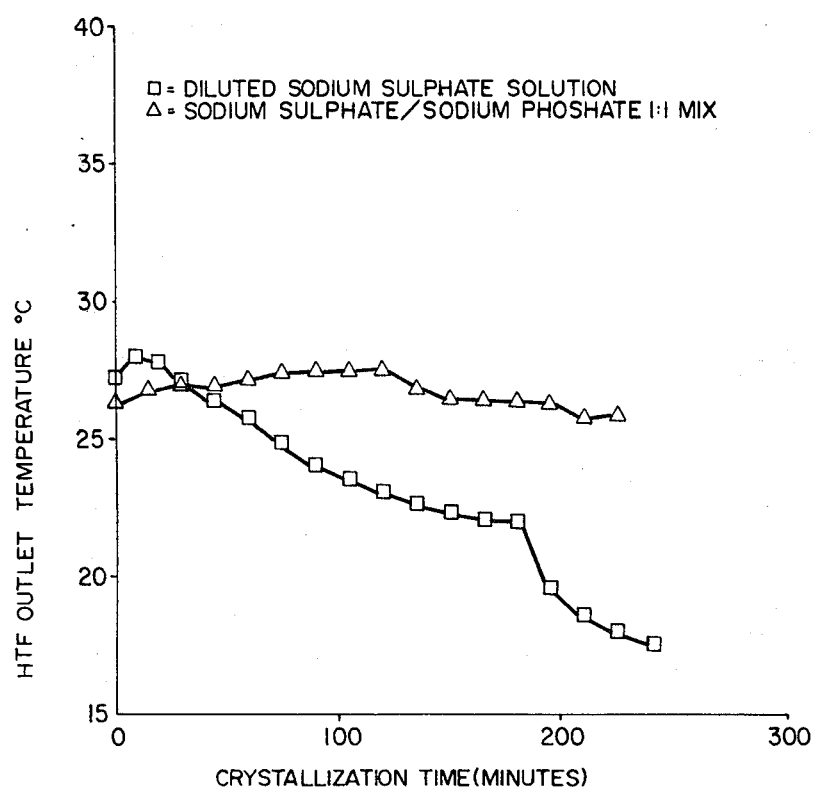
FIG. 2 illustrates graphically the temperature profile of two runs referred to in the Example, comparing the present invention with a system using $Na_2SO_4.10H_2O$ alone.
Figure 3:
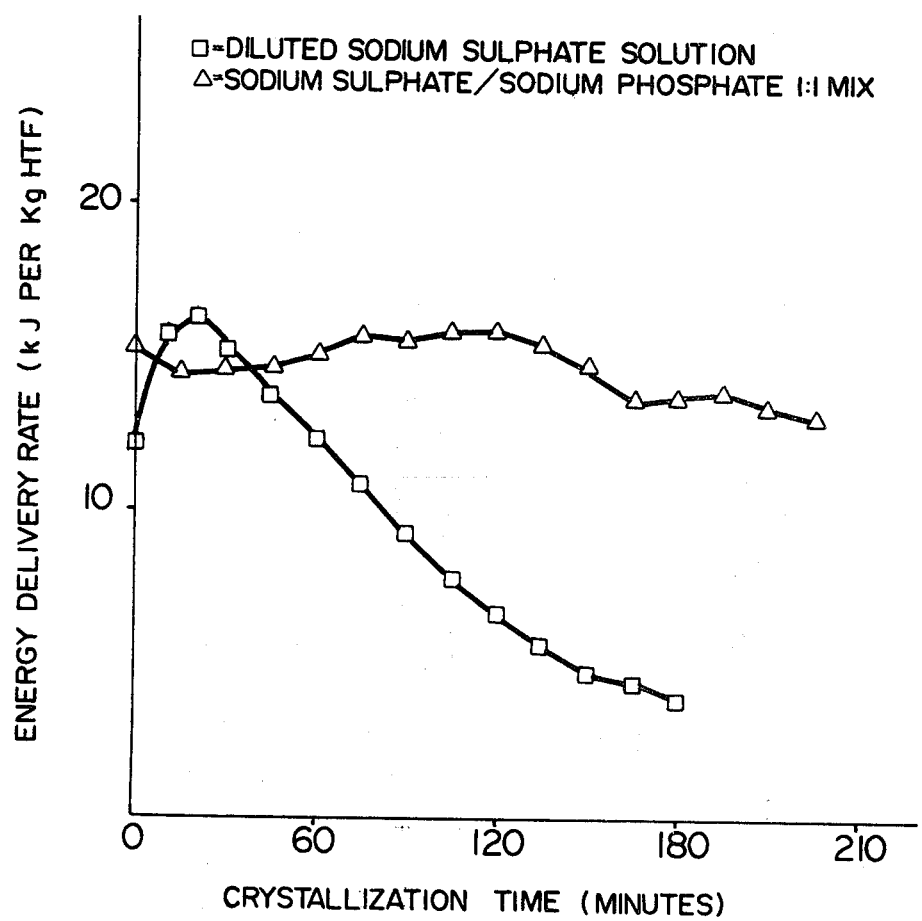
FIG. 3 illustrates the energy delivery rate for the runs shown in FIG. 2.

FIG. 2 provides a comparison of the temperature profile during a typical run for both a $Na_2SO_4$ and a $Na_2SO_4$—$Na_2HPO_4$ mixture of the present invention. FIG. 2 shows that the $Na_2SO_4$—$Na_2HPO_4$ mixture provides a relatively constant delivery temperature, while the $Na_2SO_4$ has a temperature drop that makes difficult full utilization of the latent energy available for the heating of buildings, without the use of a heat pump. FIG. 3 shows that the energy output for a given mass of heat transfer fluid remains relatively constant for the $Na_2SO_4$—$Na_2HPO_4$ mixture as compared with $Na_2SO_4$. Mixtures prepared from the formulation and by the method disclosed here were cycled a multitude of times through freezing and thawing experiments. The material was found to be completely reversible throughout these repeated cycles and no evidence of phase separation was found.

Further experiments were done to determine the applicability of the composition in a static system in closed containers. This simple containment has been used for proprietary thickened sodium sulfate mixes in solar space heating storage applications. In order to establish the practicality of the composition in this type of static containment, a number of glass vials, 60 ml volume, were filled with the mixture and closed with a cap. By immersion in a controlled temperature bath, the mixture was cycled between the fully charged liquid state and the fully discharged solid state. It was found that the system was completely reversible and no undissolved material accumulated. Crystallization did not occur until 22° C. indicating supercooling of about 6° C.

TABLE 1

Heat Storage System Using $Na_2SO_4$

| Run No. | Crystallization Time - Hours | Crystallization Temperature - °C. | Excess Water in the Solution - % | Solution Concentration Range % $Na_2SO_4$ | Tank Power Output During Crystallization | | Latent Heat Output - kJ | Latent Heat Output per unit volume of salt solution kJ/l |
|---|---|---|---|---|---|---|---|---|
| | | | | | Average kW | % Standard Deviation | | |
| 18 | 2.25 | 27.8–22.2 | 35.04 | 28.6–18.2 | 2.03 | 32.7 | 13,028 | 109.9 |
| 19 | 3.42 | 27.9–18.2 | 35.04 | 28.6–14.1 | 1.77 | 40.8 | 15,631 | 131.8 |
| 20 | 4.00 | 28.8–17.8 | 35.04 | 28.6–13.8 | 1.37 | 45.9 | 15,828 | 133.5 |
| 87 | 2.83 | 29.7–25.6 | 32.46 | 29.8–22.4 | 1.01 | 33.4 | 10,543 | 93.5 |
| 88 | 2.75 | 27.4–25.7 | 32.46 | 29.8–22.4 | 1.12 | 22.4 | 10,417 | 92.1 |

TABLE 2

Heat Storage System Using $Na_2SO_4$—$Na_2HPO_4$ Mixture

| Run No. | Crystallization Time - Hours | Crystallization Temperature - °C. | Tank Power Output During Crystallization | | Latent Heat Output - kJ | Latent Heat Output per unit volume of salt solution kJ/l |
|---|---|---|---|---|---|---|
| | | | Average kW | % Standard Deviation | | |
| 103 | 3.75 | 27.5–28.5 | 0.95 | 6.4 | 15,256 | 208.7 |
| 104 | 4.00 | 27.8–28.5 | 0.91 | 9.5 | 15,360 | 210.1 |
| 105 | 2.00 | 28.1–27.9 | 1.54 | 7.9 | 14,028 | 191.9 |
| 107 | 2.75 | 27.8–28.8 | 1.05 | 5.1 | 16,287 | 222.8 |
| 112 | 4.00 | 25.2–27.0 | 0.86 | 6.3 | 13,476 | 184.3 |
| 116 | 6.00 | 26.1–20.4 | 0.86 | 7.3 | 19,154 | 262.0 |

We claim:

1. A thermal energy storage material comprising a mixture of $Na_2SO_4$, $Na_2HPO_4$ and water, with a $Na_2SO_4:Na_2HPO_4$ mole ratio range of from 1.1:0.9 to 1:2, and sufficient water to convert all the $Na_2SO_4$ and $Na_2HPO_4$ to $Na_2SO_4.10H_2O$ and $Na_2HPO_4.12H_2O$, respectively.

2. The material of claim 1 wherein the mole ratio is approximately 1:1.

3. A method of preparing the thermal energy storage material of claim 1 comprising first dissolving the selected quantity of $Na_2SO_4$ in sufficient water to readily dissolve the $Na_2SO_4$, and then adding the selected quantity of $Na_2HPO_4$ and the balance of the selected quantity of water, and forming a solution.

4. A thermal energy storage system comprising, the thermal energy storage material of claim 1, a thermal energy transfer fluid immiscible with said storage material, means for contacting said fluid with said storage material to allow exchange of thermal energy therewith.

* * * * *